United States Patent [19]

Tertinek

[11] 4,180,281

[45] Dec. 25, 1979

[54] SAFETY CHAIN ARRANGEMENT FOR TOWED VEHICLES

[75] Inventor: Christian T. Tertinek, Canandaigua, N.Y.

[73] Assignee: Stone Construction Equipment, Inc., Honeoye, N.Y.

[21] Appl. No.: 898,525

[22] Filed: Apr. 20, 1978

[51] Int. Cl.² .............................................. B60D 1/12
[52] U.S. Cl. .................................... 280/457; 280/480
[58] Field of Search ............... 280/457, 480, 491 F, 280/458, 459, 432, 406 R, 406 A

[56] References Cited

U.S. PATENT DOCUMENTS 3,848,895  11/1974  Christopher ..................... 280/491 F

FOREIGN PATENT DOCUMENTS 529938  7/1931  Fed. Rep. of Germany ........... 280/406

*Primary Examiner*—John A. Pekar
*Attorney, Agent, or Firm*—Clarence A. O'Brien; Harvey B. Jacobson

[57] ABSTRACT

An improved safety chain arrangement for linking a towing vehicle connected with primary towing arrangement to a towed vehicle. The invention assures control of the towed vehicle in the event of failure of the primary towing arrangement. A safety chain of adequate length and strength to meet standard safety regulations has a hook, snap, or other retention means at each end, and passes through a post in the towed vehicle, with each end of the chain connected to the towing vehicle, such as by looping the chain ends through an aperture on the towing vehicle bumper and suitably securing each chain end. The post has a storage compartment for storage of excess links of chain, and is provided with two slotted keyholes for passage and secure retention of links of the safety chain.

10 Claims, 5 Drawing Figures

SAFETY CHAIN ARRANGEMENT FOR TOWED VEHICLES

BACKGROUND OF THE INVENTION

1. Field of the Invention

The invention relates generally to a safety arrangement for assuring that loss of control of a towable mixer will not occur in the event of failure of its hitch connection with the towing vehicle. More particularly, the invention relates to towable plaster, mortar or concrete mixers having a front post or pedestal located on the towing end of the mixer. The safety device of the present invention relates to the combination of a compartmented slotted front post of such a towable mixer, together with a safety chain having a hook, snap, or other fastening device on each end.

2. Description of the Prior Art

Use of safety chains is known for plaster, mortar, or concrete mixers and other trailers, and the like, having a hitch mechanism attached to a tow pole for towing by a towing vehicle. Such safety chains are attached to the tow pole and afford some degree of protection against failure of the hitch mechanism. However, when safety chains are attached to the tow pole, the danger exists that, in the event of failure of the hitch mechanism connecting the tow pole with the towing vehicle, the tow pole could be dislodged from the towed device, with nothing remaining to connect the towed device to the towing vehicle.

SUMMARY OF THE INVENTION

The present invention avoids hazards associated with prior methods of attaching safety chains to a towable mixer, specifically to plaster, mortar, or concrete mixers having a front post and tow pole, by linking the safety chain directly through the front post.

Accordingly, it is an object of the present invention to provide a safety device for linking a towing vehicle with a towable mixer having a front post by linking a safety chain directly through the front post.

Another object of the invention is to provide a safety chain easily installed by use of a hook, snap, or other fastening device on each end.

Still another object of the invention is to provide a safety device having a safety chain having adequate length and strength to meet standard motor carrier safety regulations, where excess length can be easily stored to keep the chain clean, to prevent entanglement of the safety chain with an operator's feet and to prevent the chain from dragging on the ground during over-the-road towing.

Yet another object of the invention is to provide an improved retention means of the safety chain in the front post, comprising a keyhole where the slot is angled forward and down at an angle coinciding with the angle the chain makes when attached to the towing vehicle.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
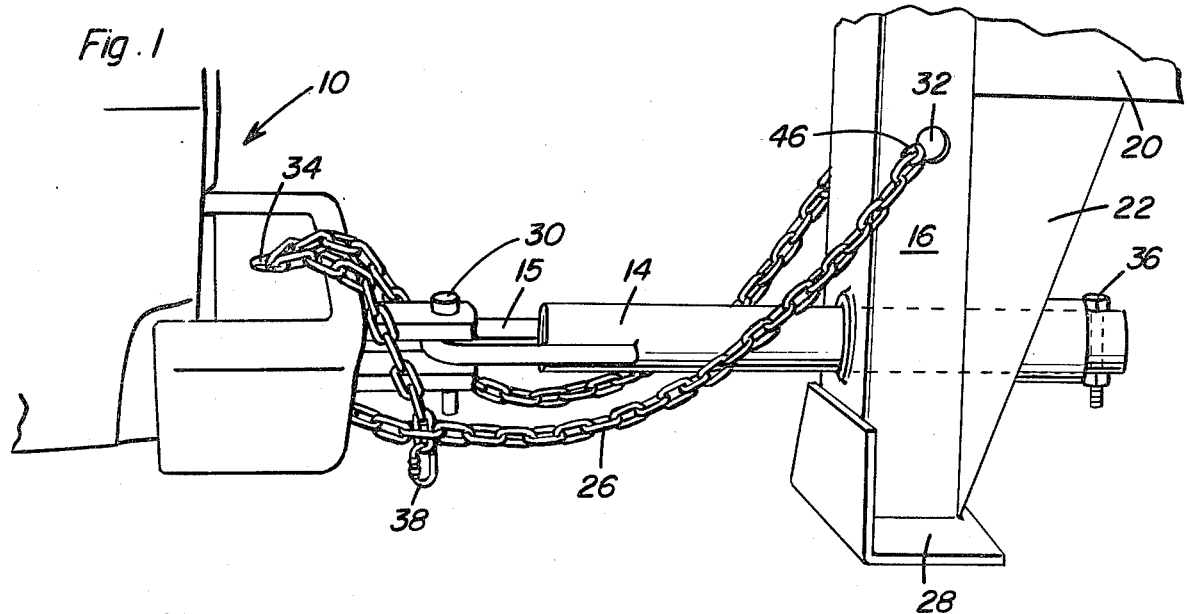
FIG. 1 is a perspective view of the safety chain installed on a towing vehicle on the left, and a towable mixer on the right.
Figure 2:
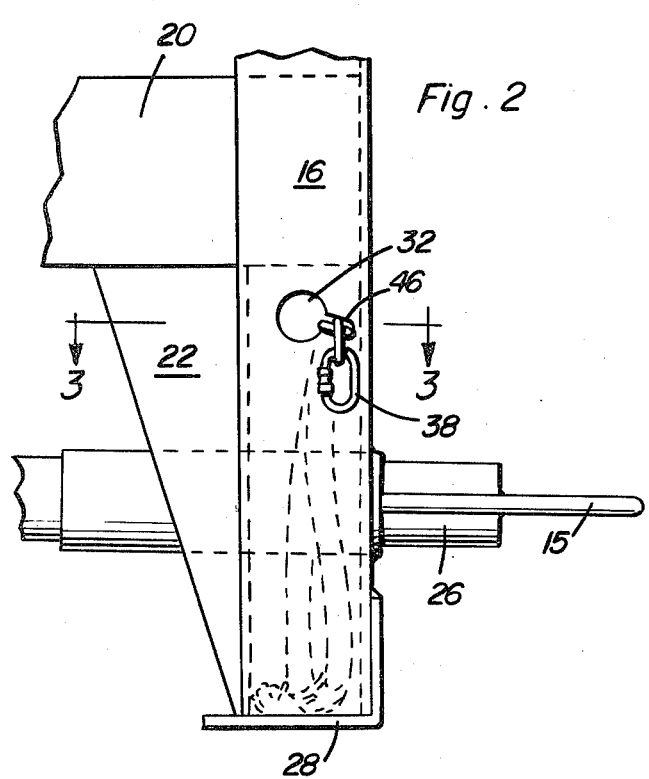
FIG. 2 is a fragmental side elevational view of the towable mixer disconnected from a towing vehicle and showing the invention when not in use.
Figure 3:
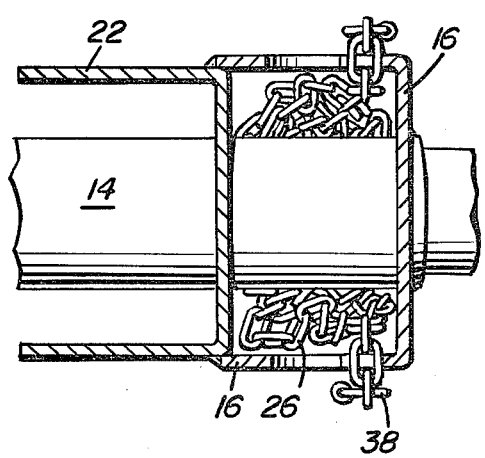
FIG. 3 is a sectional view taken substantially upon a plane passing along section line 3—3 on FIG. 2, showing the invention when not in use.

In FIG. 1, towing vehicle 10 is attached through hitch 12, which can be a loop hitch, ball hitch, or other suitable type of hitch, to tow pole 14 through loop 15. Tow pole 14 telescopes through frame member or front post 16 from a retracted position as shown in FIG. 2 to provide a relatively short protruding portion to allow the operator of towable mixer 18 or others to walk around the device without tripping over the pole to an extended in use position for connection with a towing vehicle as shown in FIG. 1. Towable mixer 18, which can be a plaster, mortar, or concrete mixer, or any other trailer or towed device of the construction shown, has a main beam 20 reinforced by channel-shaped gusset 22, which is welded to both the channel-shaped front post 16 and main beam 20. Gusset 22 is oriented with respect to front post 16 to create a compartment 24 for storage of a safety chain 26 of integral contruction when chain 26 is not in use, or for storage of excess links of chain 26 when in use. The lower surface of compartment 24 is formed by base plate 28, which is welded to front post 16 and gusset 22. Provision for draining any water collected within compartment 24 is made by openings drilled in plate 28, or by purposeful failure to complete the weldment between base plate 28 and front post 16 or gusset 22. When safety chain 26 is looped through front post 16 in the manner illustrated in FIG. 1, failure of hitch 12, through breakage or slippage of hitch pin or bolt 30, through failure of loop 15, or through disconnection of tow pole 14 from front post 16, causes retention of towable mixer 18 by the connection of chain 26 through hole 32 of towable mixer 18 and through its connection with towing vehicle 10, shown in FIG. 1 at bumper aperture 34. In prior safety chain attachment techniques, involving connection with tow pole 14, successful operation in the event of failure of hitch 12 depends upon maintenance of the integrity of the tow pole 14, and its connection with front post 16 through bolt 36 and the connection of the chain to the pole.

Figure 5:
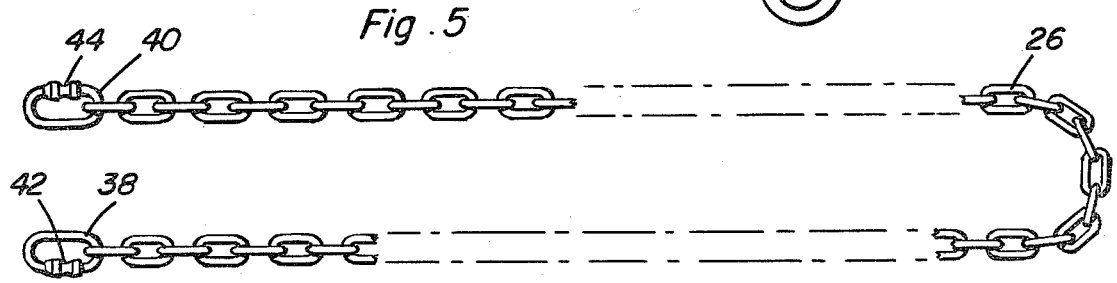
FIG. 5 is a top plan view of the chain.

FIG. 5 shows safety chain 26, including end links 38 and 40 having snaps 42 and 44. End links 38 and 40 are of sufficient size so that they will not pass through hole 32, which prevents the chain from being completely removed from the post or completely stored in compartment 24 when the end links are connected thereto. Hole 32 is provided with slot 46 which coacts with hole 32 to form a keyhole through each leg or wall of the post for retention of links of chain 26 during operation of the invention. Slot 46 is angled forward and downward from hole 32 at an angle approximatey 30 degrees from the horizontal, such angle coinciding with the angle which chain 26 makes when attached to the towing vehicle 10. Chain 26 is retained in slot 46 under its own weight, forming a path approximated by a catenary curve.

If the relation between towing vehicle 10 and towable mixer 18 is such that chain 26 is too long for the distance between attachment points at slot 46 and aperture 34, excess chain links can be stored in storage compartment 24 during towing operating by pushing links of chain 26 through hole 32, and its counterpart on the opposite wall of front post 16, and securing appropriate links of chain 26 in the slots 46. Safety chain 26 is constructed of adequate length and strength to meet standard safety regulations, such as U.S. Department of Transportation Motor Carrier Safety Regulations. Further, although the invention has been described with reference to plaster, mortar, or concrete mixers, the invention has broad applicability. Also, any type of hook, snap-hook or other fastener device may be removably attached to ends of the chain as long as they will not pass through hole 32.

Figure 4:
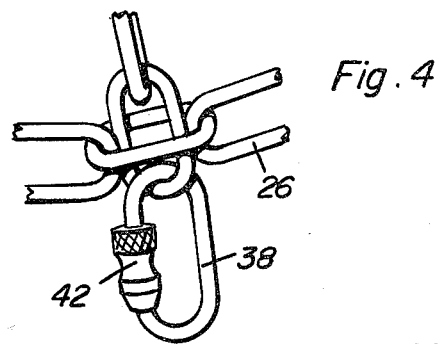
FIG. 4 is a fragmental perspective view showing the manner of attachment of the end of the chain when in use.

To place the safety chain into operation from its stored position in FIG. 2, each of the end links 38 and 40 of chain 26 is removed by use of snaps 42 and 44. Remaining links of chain 26 are grasped and the links of the chain in the slots 46 are disengaged and desired lengths of chain are pulled out of the post. Ends of chain 26 are now passed through aperture 34, as shown in FIG. 1, and looped back to a convenient inside link of chain 26. One end of chain 26 is fed through a link, as shown in FIG. 4, and the end link 38 is then reattached. End link 40 is similarly attached to an interior length of chain 26 to secure both ends of chain 26. Any excess slack in the lengths of chain 26 between the post 16 and bumper aperture 34 is placed interiorly of the post and the desired link of the chain engaged in slot 46 which positively locks each length of chain to the post independently of the other so that if one length of chain 26 becomes disconnected or breaks, the other length of the chain remains effective.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a safety arrangement for securing a towing vehicle to a towed vehicle having a front post attached to a main beam, a tow pole attached to said front post, and hitching means connecting said towing vehicle to said tow pole, the improvement comprising a safety chain, in combination with attaching means on the towed vehicle, wherein the attaching means includes the front post, the post being compartmented and having lateral keyholes, said keyholes having their slots angled forward and downward and adapted for receiving said chain.

2. The combination of claim 1 wherein said chain comprises a plurality of interconnected interior links and two end links forming the ends thereof, the chain being attached to said towing vehicle through an aperture in said towing vehicle, one end link of said chain being fastenably passable through one of said plurality of interior links of said chain, the other end link being fastenably passable through another one of said plurality of interior links.

3. The combination of claim 2 wherein said compartmented front post comprises a vertical channel having wings facing backward and a web boxed by a gusset welded to said channel and to said main beam, together with a base plate welded to the bottom of said channel and the bottom of said gusset.

4. A method of assembling the improvement of claim 3 comprising connecting the safety chain to the attaching means including the steps of removing the end links of said chain, passing said interior links of the chain through said keyholes so as to leave two free ends of interconnected interior links of the chain, passing the two free ends through said towing vehicle aperture passing one end of said interconnected interior links through an interior link of said chain, passing the other end of the interconnected links to another interior link, and reattaching each end link.

5. In combination, a towing vehicle, a towed vehicle, hitch means interconnecting said vehicles for transmitting longitudinal forces between said vehicles and a safety chain arrangement interconnecting said vehicles to maintain the vehicles connected in the event of the hitch means becoming inoperative, one of said vehicles having at least one attaching means thereon adjacent the hitch means, the other of said vehicles having a frame member adjacent the hitch means, and a flexible tension member interconnecting the frame member and attaching means, said frame member including compartment means for storing the flexible tension member thereon, and means adjustably connecting a portion of the tension member to said frame member for varying the length of the tension member extending toward the attaching means, and means adjustably interconnecting a portion of the tension member and said attaching means whereby the tension member will maintain the vehicles connected independent of the hitch means.

6. The combination as defined in claim 5 wherein said frame member is hollow, said compartment means for storing the flexible tension member including a storage compartment defined by the interior of the hollow frame member, said hollow frame member including a lateral access opening for movement of said flexible tension member therethrough into and out of the storage compartment, said means adjustably connecting the tension member to the frame member including means associated with the access opening to anchor the tension member thereto when a desired adjusted position of the flexible tension member has been reached.

7. The combination as defined in claim 6 wherein said tension member is a linked chain, said access opening being keyhole-shaped with a downwardly angled slot, said means anchoring the tension member to the access opening including the slot receiving a selected link of the chain to anchor it in adjusted position, said slot being inclined toward the other vehicle generally along the catenary curve of the chain whereby the weight of the chain will retain the selected link in the slot.

8. The combination as defined in claim 7 wherein said chain includes removable end members too large to pass through said access opening and too large to pass through other links of the chain to prevent all of the chain from being stored in the storage compartment and enable a loop to be formed in the end of the chain to connect it to the attaching means.

9. The combination as defined in claim 8 wherein said hollow frame member is a vertical post with a lateral access opening in opposed walls thereof to enable two lengths of chain to be independently connected between the inclined slots in the post and the attaching means.

10. The combination as defined in claim 9 wherein said attaching means is an aperture formed in a horizontal member at the rear of the towing vehicle, said post being disposed at the forward end of the towed vehicle, said towed vehicle including a longitudinal frame member and gusset cooperating with the post to define the storage compartment.

* * * * *